April 15, 1952 J. H. WILSON 2,592,633
ROTARY TABLE
Filed Aug. 17, 1945 7 Sheets-Sheet 1

Fig.1

John Hart Wilson
INVENTOR.

BY
Wayland D. Keith
HIS AGENT.

April 15, 1952   J. H. WILSON   2,592,633
ROTARY TABLE
Filed Aug. 17, 1945   7 Sheets-Sheet 2

Fig.2

John Hart Wilson
INVENTOR.

BY
Wayland D. Keith
HIS AGENT.

April 15, 1952   J. H. WILSON   2,592,633
ROTARY TABLE

Filed Aug. 17, 1945   7 Sheets-Sheet 5

John Hart Wilson
INVENTOR.

BY
Wayland D. Keith
HIS AGENT.

April 15, 1952　　　J. H. WILSON　　　2,592,633
ROTARY TABLE

Filed Aug. 17, 1945　　　　　　　　　7 Sheets-Sheet 6

John Hart Wilson
INVENTOR.

BY Wayland D. Keith
HIS AGENT.

Patented Apr. 15, 1952

2,592,633

UNITED STATES PATENT OFFICE 2,592,633

ROTARY TABLE

John Hart Wilson, Wichita Falls, Tex.

Application August 17, 1945, Serial No. 610,972

10 Claims. (Cl. 255—23)

This invention relates to improvements in rotary tables of the character used ordinarily in connection with rotary drilling apparatus for the drilling of deep wells.

The rotary tables used heretofore generally have been heavy and complex in structure and manner of operation and insufficiently lubricated. Various other defects have been encountered in the construction, operation and adjustment thereof, so these have not been entirely satisfactory in service.

The object of this invention is to simplify and improve the construction of such rotary tables, to construct them durably, light in weight and compact, to provide for adequate lubrication of all moving parts of the table, and with provision for adjustment to compensate for wear as occurs during use of the table in the well drilling operation. The construction also provides for the ready assembly and disassembly of the mechanism whereby the parts most subject to wear may be removed and replaced without difficulty and adequately adjusted to compensate for such wear as occurs.

Another object of the invention is to improve the mechanism for locking the rotary table against movement in either direction or to provide for movement in one direction only while restraining it against turning in the opposite direction, or so as to be free to move in either direction.

Still another object of the invention is to provide in the rotary table structure means to compensate for the wear between the rotary drive bushing and the rotatable table member, so as to prevent lost motion therebetween and to provide means to take up any slack in the operation of the drilling apparatus.

In carrying out these objects, the invention may be embodied in one form in which the operating parts are enclosed in a housing that is specially formed so as to be of light weight and yet sturdy and sufficiently rigid to be subjected to the strains encountered in the operation of the drilling apparatus. The housing encloses substantially all of the operating parts of the table, having provision for mounting the rotary sleeve on anti-friction bearings with adequate provision for lubricating the bearings and maintaining a supply of lubricant throughout the operation of the table. The drive shaft is also lubricated as well as mounted in anti-friction bearings. The bearing sleeve of the drive shaft is so constructed as to be removed from the housing or be readily assembled therein and provision is made for locking the rotary table against turning movement in either direction or for rotation in one direction only as desired, or for rotation in either direction. These and other features of the invention are contained in one embodiment as set forth in the accompanying drawings in which:

Figure 1:
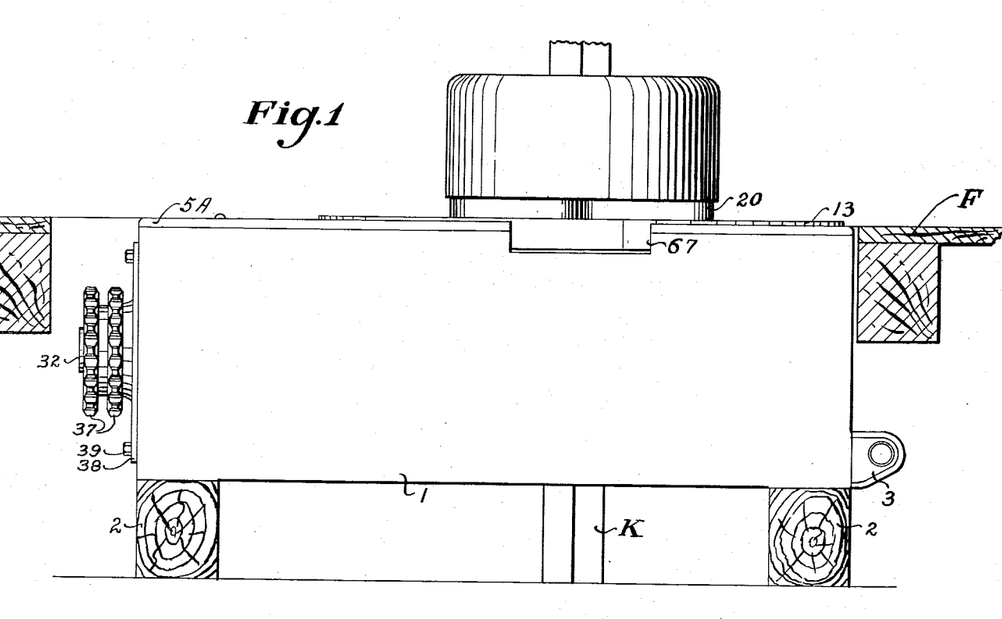
Fig. 1 is a side elevation of the rotary table structure associated with a portion of a derrick floor.

The rotary table is ordinarily mounted within a derrick structure, when used in connection with rotary drilling apparatus, a portion of which structure at the floor of the derrick is designated generally at F in Fig. 1. This rotary structure ordinarily operates a drill stem or kelly K which passes down through the rotary device into the well where it is operated during the drilling operation. The rotary device is used customarily for turning the drill stem to rotate the bit in the well, and also for supporting the drill stem as sections are added to or withdrawn therefrom. It has provision for receiving and mounting a drive bushing for driving relation with the kelly or for receiving slips to support the drill stem.

In the forms of the invention shown in the drawings, the rotary device is constructed with a housing 1, shown as supported on sills 2, so disposed that the upper surface of the housing 1 is located substantially at the level of the derrick floor F. The top surface of the housing 1 is closed and relatively smooth to facilitate operation thereover during the drilling process. One end of the housing 1 may be provided with skid members 3, secured rigidly thereto as shown in Fig. 1, to facilitate movement of the housing from place to place as is often desired.

Figure 2:
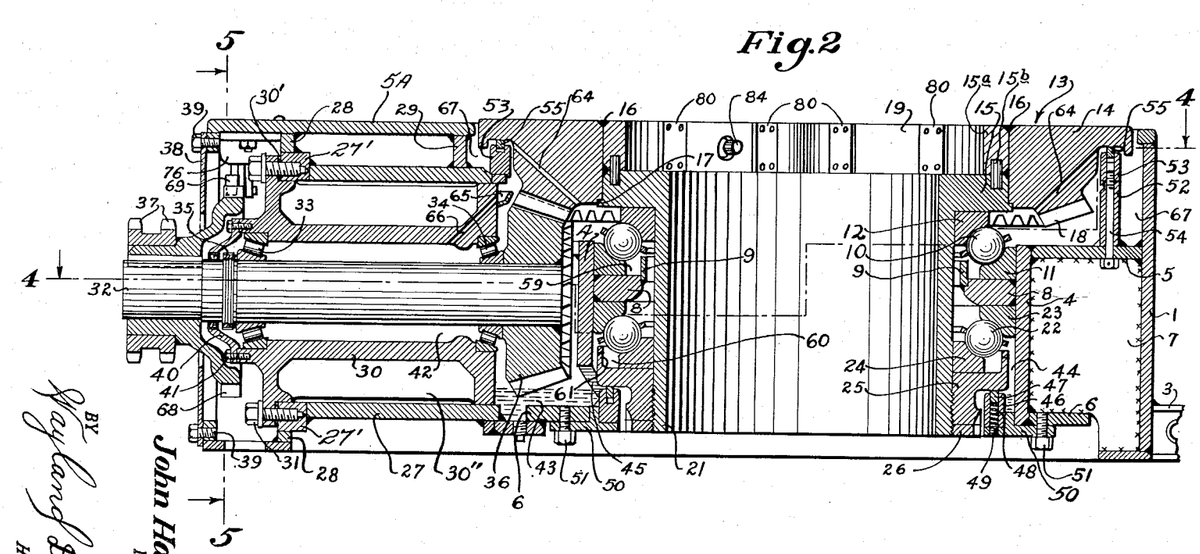
Fig. 2 is a longitudinal sectional view through the rotary table.
Figure 3:
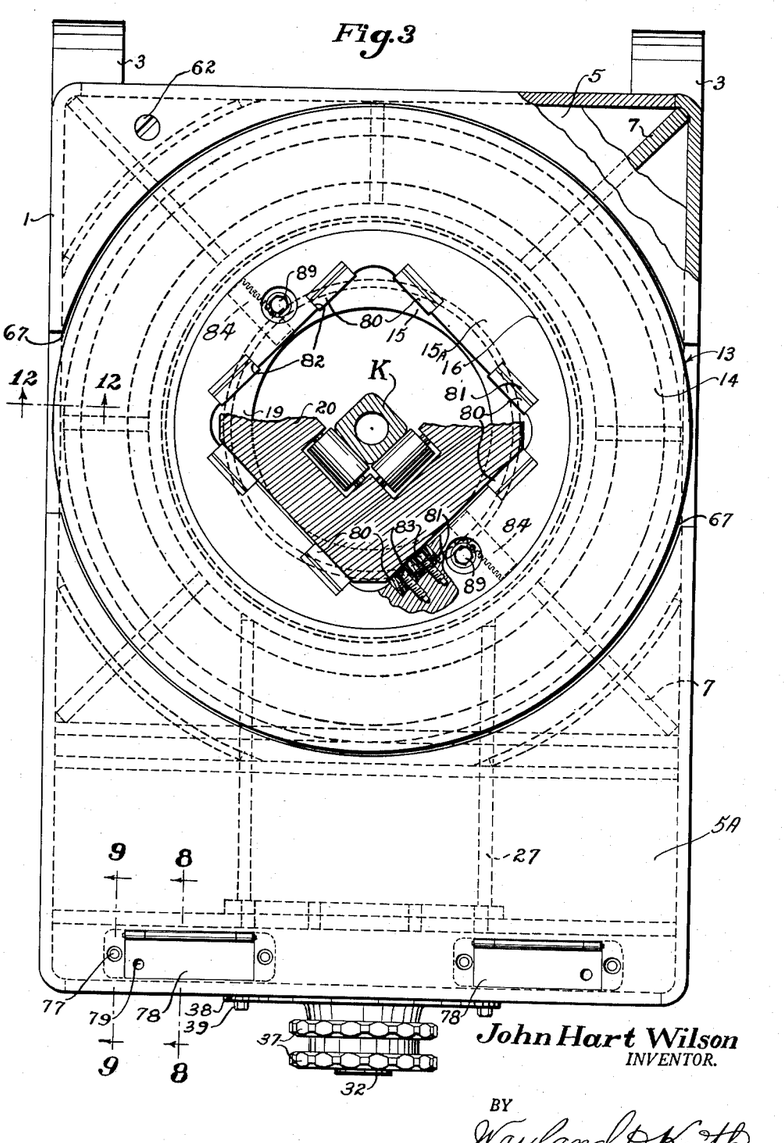
Fig. 3 is a top plan view thereof with parts broken away and in section.
Figure 4:
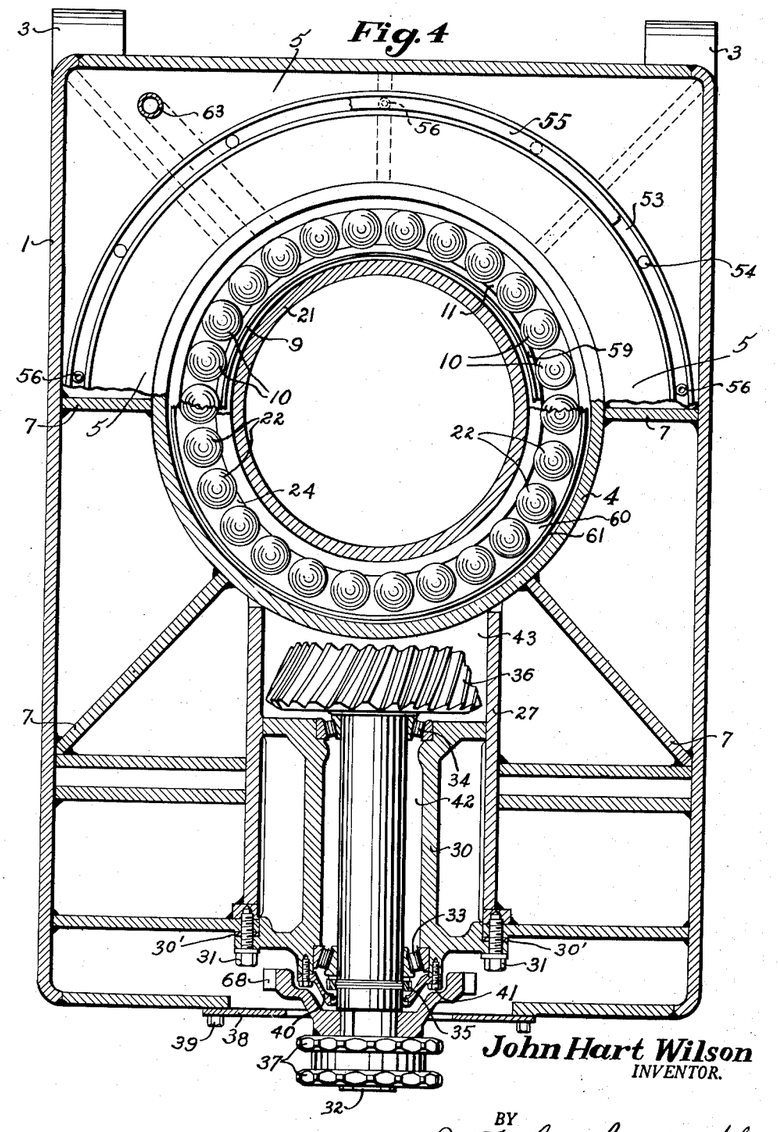
Fig. 4 is a horizontal sectional view therethrough on the line 4—4 of Fig. 2.

As shown in Figs. 1 to 4, the housing is enclosed on all surrounding sides and has a relatively flat top with a vertical opening therethrough for the passage of the kelly K through the center. As shown in Fig. 4, the housing 1 has an internal wall 4 surrounding the opening and held in spaced relation with the walls of the housing 1 by upper and lower plates 5 and 6, respectively (see Fig. 2) extending horizontally within the housing 1 from side to side thereof, and by radial plates or webs 7 (see Figs. 3 and 4). The webs 5, 6 and 7 are preferably welded or otherwise rigidly secured to the surrounding wall 4, so as to brace said wall securely and to transmit the moments of force from said wall to the housing 1, securely holding the wall in proper relation thereto.

The wall 4 and top and bottom plates 5 and 6 form a channel structure which resists distortion. The radial plates or webs 7 transmit strain exerted on the wall 4 and plates 5 and 6, outwardly to the outer wall or body structure 1. With the parts 1, 4, 5, and 6 interconnected to the webs or plates 7, as by welding, an unusually strong frame structure is provided.

Extending about the inner surface of the wall 4 is a supporting ring 8 which is welded or otherwise rigidly secured to the inner surface of the wall. The ring 8 carries an upstanding rim 9 on the inner edge thereof, which rim is shown as formed by means of a separate ring rigidly fixed to the ring 8 as by welding or otherwise.

Mounted upon the ring 8 is an anti-friction bearing shown as formed by ball bearings 10 guided by a lower race 11 and by an upper race 12. The ball bearings and the races thereof are shown as spaced outwardly from contact with the rim 9.

Seated upon the ball bearing structure 10—12 is a rotary table generally indicated at 13 and formed of outer annular section 14 and an inner flanged tubular section 15 in closely fitted relationship. The section 15 is surmounted by a ring 15a separate therefrom for machining to permit insertion of resilient members, shims and wear plates, and pinned at 15b and welded to the section 15. The ring 15a is secured to the outer section 14, as by welding 16. These sections 14 and 15 preferably are so formed that they may be fitted tightly together and held in fixed relationship. It is preferable to form a shoulder 17 on the lower outer edge of the flanges of the member 15 to form a stop for the member 14 when these are being moved into the relative positions shown in Fig. 2. The member 14 forms a ring gear, having depending teeth 18 formed on the under side thereof whereby the rotary table 13 may be driven, as hereinafter described. A top plate 5A is provided which forms a level upper surface for the housing approximately coplanar with the top of the table 13 (see Figures 1 and 2).

By forming the ring gear section 14 separately from the section 15 of the rotary table, the former may be separated therefrom by cutting out the weld 16. This will permit the ring gear section to be pressed off the section 15 in the event that the teeth become worn or broken, and a new ring gear may be applied or the teeth reworked. The parts may be secured then in proper relation to each other by rewelding the joint 16. This enables the ring gear to be replaced without the necessity for replacing the entire rotary table, whenever the gear teeth become worn.

The table ring section 15A is provided with a bushing seat 19, shown as square to accommodate the usual Kelly bushing indicated at 20 (Fig. 1) that may be mounted in the seat 19 to form a driving connection between the rotary table 13 and the kelly or drill stem in the usual way.

The section 15 includes a depending skirt 21 which extends downwardly from the upper flange portion of the section substantially through the housing 1, as shown in Fig. 2, to enclose the drill stem or kelly passing through the rotary table. The skirt 21 extends downwardly within the wall 4 in spaced relation therefrom. Provision is made, preferably, for securing the rotary table against any tendency for upward movement relative to the housing 1, for which purpose I have provided a hold-down bearing on the under side of the ring 8, and also formed as an anti-friction bearing. This hold-down bearing is shown as formed by ball bearings 22 interposed between an upper race 23 and a lower race 24. The upper race 23 is in abutting relation against the under side of the ring 8 at the inner surface of the wall 4, while the lower race 24 surrounds the skirt 21 and is held in proper relation thereto by a nut 25 screwthreaded on the periphery of the skirt 21 at the lower end thereof. A locking ring 26 is also threaded on the lower end of the skirt 21 for holding the nut 25 against accidental loosening and for securing the sleeve against separation from the housing.

As shown in Figs. 2 and 4, the housing 1 has a drive shaft housing 27 extending lengthwise thereof from the periphery of the wall 4, which housing 27 is spaced from the bottom wall 6, and is braced by lateral ribs 28 and 29 extending between the side walls of the housing 1 and the periphery of the drive shaft housing 27.

A drive shaft housing bushing 30 is slidably mounted in the drive shaft housing 27, being removably inserted therein and detachably secured by cap screws 31. The screws 31 extend through a flange on the drive shaft housing bushing 30 and into an abutment ring 27' fixed at the outer end of the drive shaft housing 27.

Journaled within the drive shaft housing bushing 30 is a drive shaft 32 which extends lengthwise through the bushing and is mounted on anti-friction bearings 33 and 34 at the opposite ends of the bushing 30. The position of the cone race of the bearing 33 on the shaft 32 may be adjusted by a nut 35 threaded on the shaft.

The shaft 32 carries a bevel pinion 36 on the inner end thereof in position for meshing with the teeth 18 of the ring gear. The opposite end of the drive shaft 32 carries a driving sprocket 37 fixed thereon adapted to receive the usual sprocket chain which extends thereto from the driving mechanism for the rotary.

The drive shaft 32 and the drive shaft housing bushing 30 are longitudinally adjustable by the use of shims 39' so as to adjust properly the teeth of the pinion 36 with the teeth 18 of the rotary table 13.

The shaft 32 projects outwardly through the end of the housing 1, as shown in Fig. 2, to locate the sprocket 37 externally thereof. This end of the housing is adapted to be closed by a cover plate 38 secured to the end of the housing by cap screws 39. The end of the drive bushing 30 is enclosed also by a cover plate 40 secured by cap screws 41. The bushing 30 thus encloses a chamber 42 surrounding the shaft 32 and which chamber 42 is in open communication at the inner end thereof through the bearing 34, with a chamber 43 between the surrounding wall 4 and the adjacent end of the drive bushing 30, forming a lubricant sump in the housing. The drive pinion 36 operates in this chamber 43, normally dipping in the lubricant therein.

The chamber 43 is adapted to contain a sufficient quantity of lubricant and to supply this lubricant to the moving parts of the rotary, primarily through the action of the bevel pinion 36 dipping in the lubricant and carrying some of it into contact with the ring gear from the meshing point of these two gears the lubricant will be thrown to the respective bearings and other movign parts. The sump 43 is in communication with the space 44 inside the surrounding wall 4 through an opening 45 in the bottom of the wall as shown in Fig. 2.

The space or chamber 44 is closed at its inner side by an upstanding rim 46 and an oil seal ring 47 carried thereby. The ring 47 is in pressure bearing relation against the under side of the flanged portion of the nut 25 for coactive sealing relation therewith, being held in such pressure relation by a plurality of coiled springs 48 which are inserted through the rim 46 at circumferentially spaced intervals, and confined by plug 49 (see Fig. 2). This sealing ring structure is detachably mounted on a surrounding ring cover 50 detachably secured by screws 51 to the bottom wall 6 of the housing, to be removed therefrom for disassembly of the enclosed parts when desired. The oil level in the sump 43 normally is below the upper edge of the oil seal ring 47.

In a manner similar to this bearing ring structure, the periphery of the rotary table is also enclosed externally of the ring gear teeth 18. A sealing rim support 52 is mounted upon the top plate 5 at a point adjacent the periphery of the rotary table, and the support 52 carries a sealing rim 53 thereon detachably secured by screws 54. An oil seal ring 55 extends upwardly from the rim 53 (see Fig. 12) and is normally pressed upward by coiled springs 56 circumferentially spaced about the rim 53 for applying upward pressure to the ring 55. The latter is in pressure relation in an annular groove 57 in the rotary table portion 14, the outer edge of which is formed by a flange 58 arranged in downward overlapping relation with the oil seal ring 55, to enclose and protect this oil seal ring from mud and all other foreign matter.

As lubricant is carried to the ring gear teeth 18 by the rotation of the pinion 36, the major portion of this lubricant will be carried around the ring gear and fall therefrom onto the bearings 10, or be directed thereto by the upper surface of the top wall 5. This lubricant will pass downward through the bearings 10 into an annular lubricant chamber 59 closed by the rim 9 and ball race 11 to a height where the lubricant therein will be in contact with the balls 10 to maintain a constant supply of lubricant to these ball bearings during operation. The rim 9 is spaced outwardly from the periphery of the skirt 21, so that the lubricant from the chamber 59 can overflow the rim 9 and pass downwardly to the bearings 22. The lubricant will pass between the bearings 22 and into a lubricant chamber 60 enclosed between the race 24 and an upstanding flange 61 formed on the periphery of the nut 25. The lubricant will overflow the chamber 60 and pass downward externally of the flange 61 into the chamber 44, passing from the latter through the opening 45 back to the sump 43.

The lubricant can be supplied to the chamber 43 through an inlet 62 (Fig. 3) at the top surface of the housing 1 from where it will be directed through a pipe 63 (Fig. 4) leading to the sump 43.

Oil holes 64 extend outwardly and upwardly at circumferentially spaced points through the ring gear section 14 from points adjacent the inner ends of the teeth 18, terminating at points adjacent the oil sealing ring 55. By the radial disposition of these oil holes 64, some of the lubricant that is picked up by the bevel gear 36 will be directed outwardly by centrifugal force from the teeth 18 to lubricate the oil seal ring 55. Some of this oil will drip back from the ring 55 adjacent the bevel gear 36 where it will be caught by a trough 65 from which one or more oil passageways 66 lead into the chamber 42 around the drive shaft 32, to lubricate the bearings 33 and 34 for this drive shaft. This lubricant will then pass through the bearings 34 back into the oil sump 43.

In this way, all of the operating parts of the rotary are supplied with forced lubrication through the action of the drive gear 36, to insure the smooth and easy operation of the parts, free of dirt, mud and other foreign matters.

A slight space is provided between the rotary table 13 and the adjacent portion of the top of the housing 1, but any mud or other foreign matter that may find its way through this space will be collected in grooves 67, as shown in Figs. 1, 2 and 3, which grooves are open at opposite sides of the housing 1 to permit any excess of foreign matter to drain out of these grooves. Such foreign matter may be forcibly ejected therefrom by directing water under high pressure into the grooves to wash out the accumulation when required.

Figure 5:
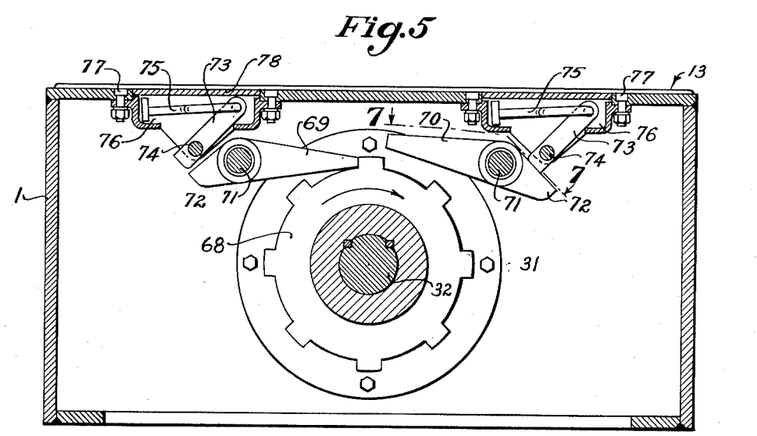
Fig. 5 is a cross section on the line 5—5 of Fig. 2.
Figure 6:
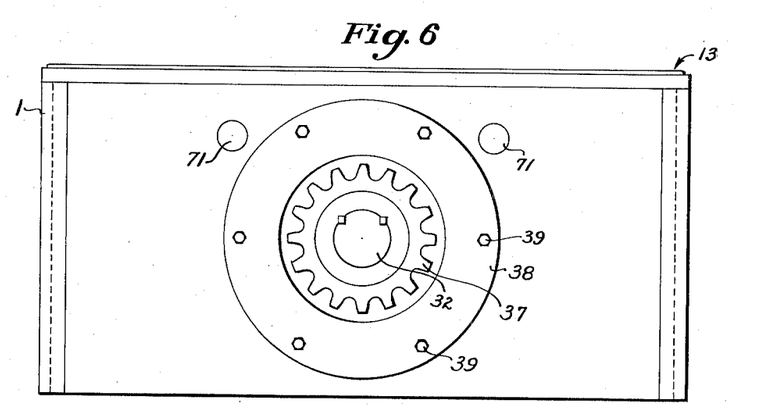
Fig. 6 is an end elevation of the rotary table structure at the drive end thereof.
Figure 7:
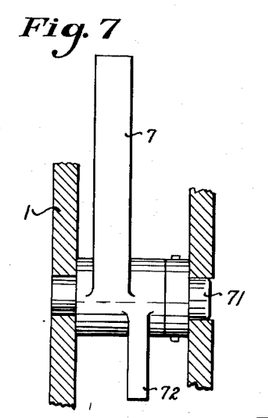
Fig. 7 is a detailed cross section of a locking pawl, taken substantially on the line 7—7 of Fig. 5.
Figure 8:
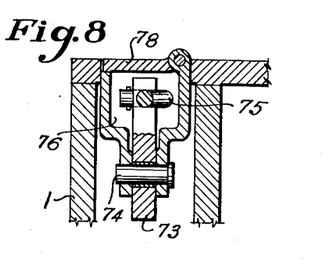
Fig. 8 is a detailed cross section through the pawl actuating means, on the line 8—8 of Fig. 3.
Figure 9:
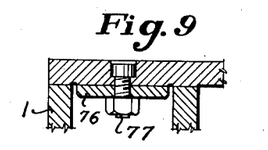
Fig. 9 is a detailed cross section through the pawl operating means housing support, on the line 9—9 of Fig. 3.

It is desirable to provide for the locking of the drive shaft 32 in a set position or to permit its rotation in one direction only, or to allow rotation in either direction. Accordingly, I have provided a ratchet member 68 keyed to the drive shaft 32, as shown in Figs. 2 and 5, and having peripheral ratchet teeth thereon. The toothed member 68 is keyed to the shaft 32 outside the face plate 38, but extends into an outer chamber within the housing proper but exteriorly of the housing 27 and the oil chamber 42. The teeth of the ratchet member 68 are adapted for selective engagement by opposed pawls 69 and 70 each of which is pivotally mounted on a pivot pin 71 journaled at opposite ends in the rib 28 and face plate 38, as shown in Fig. 7. Each of the pawls 69 and 70 has a heel portion 72 is position for engagement by one end of a lever 73 pivotally mounted on a pin 74. The lever 73 has an operating handle 75 connected therewith for operation of the lever by hand when desired. This handle 75 is disposed normally within a lever housing 76 suspended by bolts 77 from the top of the housing 1 (see Figs. 5 and 9). The housing 76 is normally closed by a cover 78 (Fig. 8) which is disposed substantially flush with said top surface. The lever housing 76 also carries the pivot pin 74 on which the lever is mounted to permit assembly and disassembly of this lever structure as a unit. The door 78 may be provided, if desired, with an opening 79 therein for the insertion of a hook or finger into the opening to lift the door and gain access to the handle 75.

Either or both of the pawls 69 and 70 may be lowered into engagement with the ratchet teeth of the member 68 by swinging the operating lever 73 to one side or the other of the pivot pin 74, so the lever will lie substantially parallel with the upper face of the heel portion 72 or at right angles thereto, as shown respectively at the left and at the right in Fig. 5. The operating handle 75 may be lowered into resting relation within the handle housing 76 either in the position shown at the left in Fig. 5, or in the opposite position shown at the right therein, according to the position of the lever 73. The lever handle 75 fits snugly into the lever housing 76, substantially in a horizontal position and by gravity locks the lever handle 75 against accidental movement to engage the pawls 69—70 if in one position and prevents disengagement of the pawls if in the opposed positions. The door closure 78 forms a further locking means for the lever handle 75. In this way, with either of the pawls 69 or 70 in engagement with the ratchet member 68, the drive shaft 32 will be retained against rotation in one direction or another while free to turn in the opposite direction.

With the pawl 69 lowered into engagement with the ratchet member 68, as shown in Fig. 5, the drive shaft 32 is free to rotate in clockwise direction while being restrained against rotation in a counter-clockwise direction. With the pawl 70 lowered into engagement with ratchet member 68, the drive shaft 32 is free to rotate in a counter-clockwise direction, but is held against rotation in a clockwise direction. With both the pawls 69 and 70 lowered into engagement with the ratchet member 68, the drive shaft 32 is restrained against rotation in either direction, likewise locking the rotary table 13 against turning in either direction. When it is desirable to rotate the drive shaft 32 in both directions, both the pawl 69 and the pawl 70 are raised, thereby permitting the free turning of the shaft 32 and of the rotary table 13 freely in either direction.

The ratchet member 68 is keyed to the shaft 32 and has a shoulder on the outer end thereof upon which is fitted a sprocket 37. This sprocket 37 is preferably welded to the hub of the toothed member 68, or it may be keyed thereto as desired. By having this arrangement, no damage will be inflicted to the shaft 32 in the event that power is applied accidentally to the sprocket 37 while one of the pawls 69 or 70 has the ratchet member 68 locked against rotation. The only possible damage that would occur, would be the shearing of the weld or of the key between the sprocket 37 and the member 68, if the alternate key type construction were used.

Provision may be made, if desired, to compensate for wear between the faces of the Kelly bushing 20 and the seat 19. I have provided wear plates or compensating shims 80 for this purpose, having resilient plates 81. The resilient plates 81 are preferably made of rubber, or rubber fabric, and are adapted to cushion the shock or back-lash between the drill stem and the rotary table by lessening the chattering or vibrations produced during the drilling operation. The shims 80 and resilient plates 81 are received in recesses 82 formed in the respective side walls of the bushing seat 19 where they are held in place by screws 83. Additional shims may be inserted, if desired, to take up for wear. These shims 80 may be adjusted to compensate for wear by the Kelly bushing and are especially constructed of hardened metal to resist wear. The wear plates 80 project outward into the squared opening of the bushing seat 19 to prevent the Kelly bushing from contacting the side of the squared opening in the seat 19.

Figure 15:
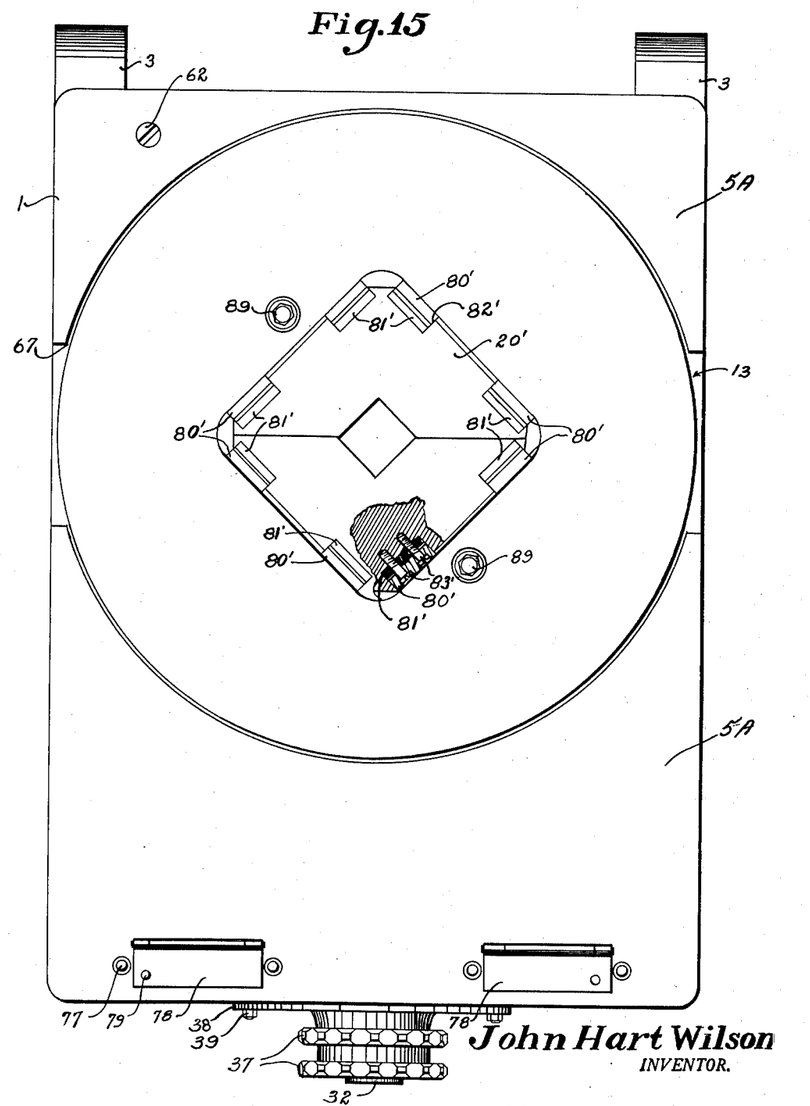
Fig. 15 is a plan view of a rotary table using a modified form of drive bushing.

Fig. 15 illustrates a rotary bushing 20' which has hardened wear plates 80' fitted within recesses 82', and projects slightly outward therefrom to engage the squared opening 19 of the rotary table 13. The hardened wear plates 80' have resilient members 81' positioned intermediate the bushing 20' and the wear plates. Shims may be interposed within the recesses 82' to adjust the bushing 20' with respect to the squared opening 19. The wear plates 80' are held in place by cap screws 83'.

The form of the bushing as shown in Fig. 15 may be used with any rotary table having a squared opening within which the bushing will interfit. It will cushion the back-lash of the drill stem and reduce vibration during the drilling operation.

Figures 10, 11, 12, 13, 14:
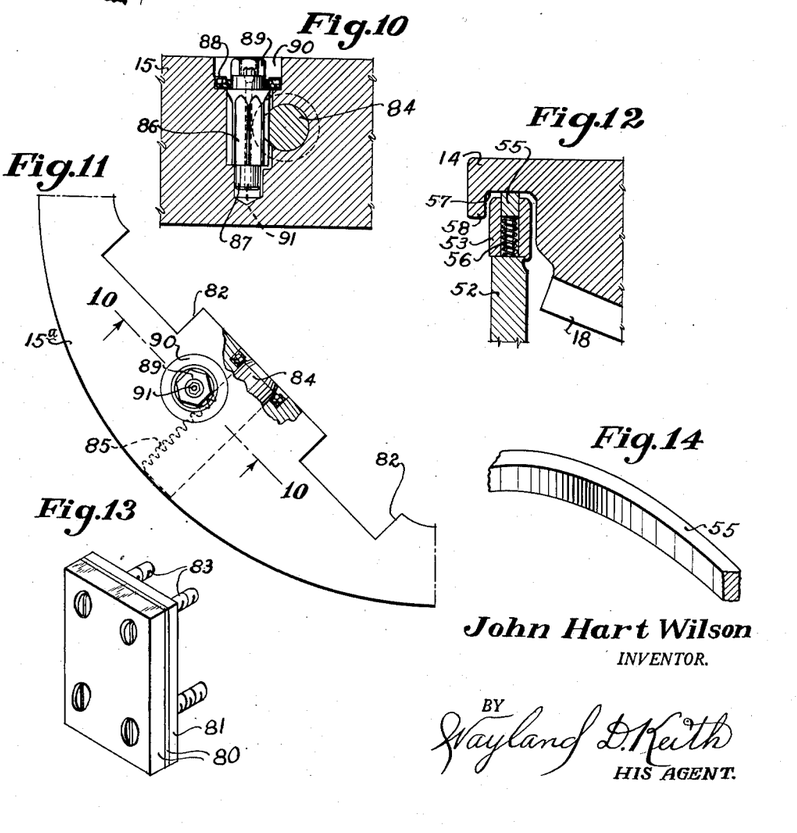
Fig. 10 is a detailed cross section through a portion of the rotary table showing the bushing locking means, taken on the line 10—10 of Fig. 11.
Fig. 11 is a top plan view thereof.
Fig. 12 is a detailed cross section through a portion of the rotary table on the line 12—12 of Fig. 3.
Fig. 13 is a perspective view of one of the rotary table shims detached and removed.
Fig. 14 is a detailed perspective view of a portion of one of the sealing rings.

On each opposite side of the Kelly bushing seat 19 is mounted a locking bolt 84, slidable through the table section 15 (see Figs. 3 and 11). The bolt 84 is provided with a rack 85 on one face thereof in position to mesh with a gear 86 formed on a rotatable pin 87 journaled in the table section 15 (see Fig. 10). The upper end of the pin 87 is journaled in a sealing ring 88 and has a squared portion 89 located within a recess 90 in the table section 15. An axial opening 91 is provided through the pin 87 to lubricate the bearing at the lower end thereof.

The rotary table is adapted to be used generally in the manner of rotary tables employed heretofore for turning the drill stem by the application of rotative movement to the kelly K as the latter is fed down through the Kelly bushing 20 mounted in the rotary table.

Power is applied by the usual sprocket chains to the sprocket 37 for driving the shaft 32. This shaft turns freely in the bearings 33 and 34 and rotates the bevel gear 36 in mesh with the ring gear teeth 18 carried by the ring gear element 14. This will cause a turning movement of the rotary table 13 and thereby rotate the Kelly bushing 20 and the kelly passing therethrough.

As the bevel gear pinion 36 is rotated while dipping in the oil or other lubricant contained in the sump 43, this will cause the oil to be carried on the surface thereof to the ring gear teeth 18, or to be applied thereto by splash lubrication, whereby the oil will be carried continuously around the circumference of the rotary table 13. This lubricant will fall onto the top plate 5 which extends throughout the major portion of the circumference of the rotary table except at the point where an opening therein allows the operation of the gear 36. The lubricant which drips onto the top wall 5 flows through the bearings 10 into the chamber 59, from which it overflows past the rim 9 to the space therebelow externally of the skirt 21 to lubricate the bearings 22. The lubricant flows through the bearings 22 into the chamber 60 from which it overflows into the chamber 44 and returns therefrom through the opening 45 into the sump 43.

Some of the lubricant carried by the ring gear teeth 18 will be discharged by centrifugal force through the openings 64 to the region of the oil seal ring 55. This lubricant or oil keeps the peripheral portion of the ring properly lubricated to maintain the sealing relation thereof with the rotatable table 13 and any excess lubricant will fall back either onto the upper surface of the wall 5 or into the trough 65 (at one point at least), following from the trough through the passageway 66 into the chamber 42. This oil will properly lubricate the bearings 33 and 34 and then return between the latter into the sump 43.

Thus it will be evident that all operating parts of the rotary will be effectively lubricated, so as to maintain the smooth running operation of these parts free of dirt, mud or other foreign matter. Any mud which may find its way into the housing 1 around the rotatable table 13, may be forcibly ejected therefrom by directing a water spray transversely through the grooves 67 at the opposite sides of the table.

The table may be driven in either direction desired, according to which of the pawls 69 and 70 is in engagement with the ratchet member 68. In the relation shown in Fig. 5, the drive shaft 32 may be driven in the direction indicated by the arrows. The position of these pawls may be changed readily by the operator merely upon lifting the doors 78 and manipulating the handles 75 to operate the pawls to raised or lowered positions, respectively, by the levers 73. When it is desired to hold the table against turning movement in either direction, both pawls would be lowered into engagement with the ratchet member 68, and the table would be effectively locked then against rotation, or with both pawls 69 and 70 in raised position, the shaft 32 may be rotated in either direction.

The invention is shown in only two embodiments thereof merely for purpose of illustration. However, it is realized and contemplated that various changes may be made in the construction within the spirit of the invention. Therefore, it is not desired to limit this invention to the details of the construction illustrated except insofar as is set forth in the claims.

I claim:

1. In a rotary table for driving well-drilling equipment, the combination of a housing, a rotatable table mounted in the housing and having an axial opening therethrough, said rotatable table including a surrounding ring gear, a drive shaft mounted in the housing and having a gear thereon in driving relation with the ring gear, bearing means for journaling the drive shaft, said housing having a recess forming a lubricant sump therein surrounding the lower portion of the shaft-carried gear, a co-axial, annular, spring-pressed oil seal ring in cooperating sealing relationship with the peripheral upper portion of the rotatable table, a second oil seal ring positioned in cooperating sealing relation with a lower portion of said rotatable table above the normal oil level in the sump and in communication therewith, and spring means pressing said second ring axially against said lower portion of the rotatable table, and means forming a passage for directing lubricant from the sump radially outwardly through a portion of the table to said first named oil seal ring upon the operation of the gear therein to maintain the sealing relation thereof with respect to the rotatable table.

2. In a rotary table for well-drilling equipment, the combination of a housing, a table mounted in said housing for rotation about a vertical axis and having an axial opening therethrough for receiving a drill stem, said table having an upper outer peripheral portion adapted to move adjacent a corresponding annular portion of the housing when the table rotates, a co-axial annular spring-pressed oil seal ring in cooperating sealing relationship between the aforesaid relatively movable portions, an annular series of downwardly directed gear teeth on the underside of the table inwardly of the seal ring, a horizontal drive shaft journalled in the housing, a gear fixed on said shaft and meshing with the gear teeth on the table, an oil sump in the lower portion of the housing adapted to hold oil to a level below which said shaft-carried gear dips, whereby said last-named gear may carry oil upwardly and direct it against the underside of the table inwardly of the gear teeth thereon, and at least one radial duct passing through the marginal portion of said table to by-pass part of said oil around the gear teeth to the outwardly disposed oil seal ring to effectively maintain the seal.

3. In a rotary table for well-drilling equipment, the combination of a housing, a table mounted in said housing for rotation about a vertical axis and having an axial opening therethrough for receiving a drill stem, said table comprising a substantially circular upper portion including a ring gear and an annular depending central portion, means for journalling said depending portion of the table in the housing, said journalling means including two annular vertically-spaced anti-friction bearings, a substantially horizontal drive shaft journalled in the housing, a gear fixed on said shaft, disposed beneath said ring gear, and meshing with the same, an oil sump in the lower portion of said housing adapted to hold oil to a level below the lower bearing and beneath the surface of which said shaft-carried gear dips, whereby said last named gear may carry oil upwardly from said sump and direct it upon the ring gear portion of the table, cascade lubricating means for said vertically spaced bearings comprising annular troughs within which at least a portion of the bearing elements of said respective bearings dips, a side wall on each of said troughs providing a lip over which oil may overflow, the upper trough disposed beneath the ring gear portion of the table to catch oil falling therefrom, the lower trough disposed beneath the trough of the upper bearing to catch oil flowing over the lip of the latter, and a portion of the sump disposed beneath the trough of the lower bearing to catch the oil flowing over the lip thereof, all whereby a complete circulatory lubricating system is provided for the table driving gears and both of the journal bearings for the table.

4. In a rotary table for well-drilling equipment, the combination of a housing, a table mounted in said housing for rotation about a vertical axis and having an axial opening therethrough for receiving a drill stem, said table comprising a substantially circular upper portion including a ring gear disposed upon the underside thereof and a depending central cylindrical tubular portion, a cylindrical wall rigid with said housing and surrounding and spaced from the said depending central portion of the table, means for journalling said depending portion of the table upon the said surrounding wall, said journalling means including two annular vertically-spaced anti-friction bearings disposed between said depending portion and said surrounding wall and confined between races respectively carried by said portions, a substantially horizontal drive shaft journalled in the housing, a gear fixed on said shaft, disposed beneath said ring gear, and meshing with the same, an oil sump in the lower portion of said housing adapted to hold oil to a level below the lower bearing and beneath the surface of which said shaft-carried gear dips, whereby said last-named gear may carry oil upwardly from said sump and direct it upon the ring gear portion of the table, cascade lubricating means for said vertically spaced bearings comprising annular containers within which at least a portion of the bearing elements of said respective bearings dip, means through which oil may flow downwardly from said containers, the upper container disposed beneath the ring gear portion of the table to catch oil falling therefrom, the lower container disposed beneath the container of the upper bearing to catch oil flowing from the latter, and a portion of the sump disposed beneath the container of the lower bearing to catch the oil flowing therefrom, all whereby a complete circulatory lubricating system is provided for the table driving gears and both of the journal bearings for the table.

5. In a rotary table for well-drilling equipment, the combination of a housing, a table mounted in said housing for rotation about a vertical axis and having an axial opening therethrough for receiving a drill stem, a drive shaft rotatably mounted in said housing and gear means operatively connecting said shaft with the table for rotating said table, means for rotating said drive shaft, an annular toothed member on said drive shaft, a pawl movably mounted within said housing adjacent said annular toothed member in position to be engaged with and disengaged therefrom for locking and releasing the turning movement of said shaft, a top wall for said housing, a recess formed in the upper surface of said top wall, an opening in the bottom of the recess; a pawl-controlling lever pivotally mounted on said housing adjacent the bottom of said recess, extending through said opening, and having a manipulating end swingable to and fro within the recess from one end thereof to the other depending upon the engaged or disengaged position of the pawl; a handle freely pivoted at one end to the said end of said lever, said handle being of substantially the same length as that of the recess to fit snugly therein when the lever is in one or the other of its end positions; whereby the handle, the lever, and the controlled pawl are locked in pawl-engaged or pawl-disengaged position.

6. In a rotary table installation for driving well drilling equipment, the combination of a housing, a rotatable table mounted in the housing and having an axial opening therethrough, said rotatable table including a surrounding ring gear, a drive shaft journaled in the housing and having a gear thereon in driving relation with the ring gear, means for journaling the drive shaft, said housing having means forming a lubricant sump therein surrounding and immersing the lower portion of the shaft-carried gear, means for journaling the rotatable table in the housing including anti-friction bearings, the immersed gear serving to carry lubricant from said sump upwardly to the ring gear on the table, lubricant catching and distributing means for conveying lubricant running off the ring gear to the table journal bearings and thence back to the sump, and lubricant catching and distributing means for conveying lubricant to the shaft bearings and thence back to the sump, said ring gear comprising downwardly facing teeth on the underside of the table, the first named lubricant catching and distributing means being on one side of the ring gear and the second named lubricant catching and distributing means being on the other side thereof, and by-pass lubricating passageways formed in the table around the teeth of the ring gear for the passage of lubricant from one side to the other of said teeth.

7. In a rotary table installation for well-drilling equipment, the combination of a housing, a table mounted in said housing for rotation about a vertical axis and having an axial opening therethrough for receiving a drill stem, a drive shaft rotatably mounted in said housing and gear means operatively connecting said shaft with the table for rotating said table, means for rotating said drive shaft, an annular toothed member on said drive shaft, a pawl movably mounted within said housing adjacent said annular toothed member in position to be engaged with and disengaged therefrom for locking and releasing the turning movement of said shaft, a recess formed in the outer surface of a wall of said housing, said recess having an opening in the bottom thereof; manually operable pawl manipulating means normally disposed within said recess and extending through said opening in the bottom thereof into operative relationship with the pawl, said means including a pivoted handle portion which is of substantially the same length as that of the recess to fit snugly therein only when the manipulating means is in one or the other of its end positions; whereby the handle is locked in pawl engaging or pawl disengaging position, thus preventing manual shifting of the pawl without removing the handle from the recess.

8. In a rotary table installation for well-drilling equipment, the combination of a housing, a rotatable table having an axial opening therein for receiving a drill stem therethrough, means for driving said table, said axial opening in the table being substantially square in cross-section at least at the upper portions thereof, a drive bushing of similar square section received within the walls of said square portion of the opening, the side walls of the bushing proper and of the square portion proper of the opening in the table being spaced a short distance apart to provide a narrow peripheral clearance space, renewable metal wear and shock plates disposed within said clearance space flatwise and parallel with the wall portions to which they are respectively adjacent, said plates being removably secured to one of said walls and in bearing relationship with respect to the adjacent wall upon the opposite side of said clearance, rubber-like cushioning plates disposed behind said wear plates between the latter and the wall to which they are secured, whereby the metal wear plates backed by the rubber-like cushioning plates serve to maintain resilient contact between the table and the drive bushing, to absorb shock, and to compensate for wear.

9. In a rotary table installation for well-drilling equipment, the combination of a housing, a rotatable table having an axial opening therein for receiving a drill stem therethrough, means for driving said table, said axial opening in the table being substantially square in cross-section at least at the upper portions thereof, a drive bushing of similar square section received within the walls of said square portion of the opening, the side walls of the bushing proper and of the square portion proper of the opening in the table being spaced a short distance apart to provide a narrow peripheral clearance space, abrasion and shock absorbing and compensating pads secured to one of said spaced walls, each disposed flatwise and parallel to the wall portions to which they are respectively adjacent and adapted to project across said clearance space into resilient bearing relationship with the opposite wall, said pads being arranged in pairs straddling the corners of the peripheral walls of the table and bushing but spaced somewhat from the apex of said corners, and each pad also being of less extent than one-half of the length of a side of the square opening, said pads comprising a hard metal outer plate backed by a rubber-like cushioning plate and optionally usable shims for taking up play due to wear, said pads serving to maintain resilient contact between the table and the drive bushing, to absorb rotative and other abrasion and shock, and to compensate for wear.

10. In a rotary table installation for well-drilling equipment, the combination of a rectangular housing having top, side, and end walls, a table mounted in said housing for rotation about a vertical axis and having an axial opening therein for receiving a drill stem, means for driving said table, a framework within said housing for affording a sturdy supporting means for said table, said framework comprising a table-surrounding member spaced inwardly from the side and end walls of the housing and comprising a cylindrical portion having upper and lower horizontal flanges extending radially outwardly from said cylindrical portion throughout at least the major portion of the circumference of said portion, whereby there is provided an annular, outwardly-flanged, channel structure, vertically disposed plate-like reinforcing webs welded to and extending radially outwardly from circumferentially spaced points on said cylindrical portion and also welded at their outer ends to the side and end walls of the housing, bearings for said table, and means on said cylindrical portion for supporting said bearings.

JOHN HART WILSON.

REFERENCES CITED

The following references are of record in the file of this patent:

UNITED STATES PATENTS

| Number | Name | Date |
| --- | --- | --- |
| 1,797,486 | Stone et al. | Mar. 24, 1931 |
| 1,929,183 | Zilen | Oct. 3, 1933 |
| 1,969,035 | Rice et al. | Aug. 7, 1934 |
| 2,005,137 | Faulkner et al. | June 18, 1935 |
| 2,008,774 | Spalding | July 23, 1935 |
| 2,020,004 | Smith | Nov. 5, 1935 |
| 2,075,028 | Driscoll | Mar. 30, 1937 |
| 2,176,788 | Campbell | Oct. 17, 1939 |
| 2,183,012 | Davidson | Dec. 12, 1939 |
| 2,204,645 | Baash | June 18, 1940 |
| 2,205,269 | Morgan, Jr., et al. | June 18, 1940 |
| 2,243,131 | Smith et al. | May 27, 1941 |